(12) United States Patent
Casey et al.

(10) Patent No.: US 8,255,323 B1
(45) Date of Patent: Aug. 28, 2012

(54) MOTION BASED PAYMENT CONFIRMATION

(75) Inventors: Brandon J Casey, San Jose, CA (US); Gary Wipfler, Los Altos, CA (US); Erik Cressall, San Jose, CA (US)

(73) Assignee: Apple Inc., Cupertino, CA (US)

( * ) Notice: Subject to any disclaimer, the term of this patent is extended or adjusted under 35 U.S.C. 154(b) by 690 days.

(21) Appl. No.: 12/351,714

(22) Filed: Jan. 9, 2009

(51) Int. Cl.
G06Q 40/00 (2012.01)

(52) U.S. Cl. .............................. 705/39; 705/35; 705/42

(58) Field of Classification Search .................. 705/35, 705/42
See application file for complete search history.

(56) References Cited

U.S. PATENT DOCUMENTS

| | | | |
|---|---|---|---|
| 5,590,038 A * | 12/1996 | Pitroda ............ | 705/41 |
| 5,953,710 A | 9/1999 | Fleming | |
| 6,609,113 B1 | 8/2003 | O'Leary et al. | |
| 6,749,114 B2 | 6/2004 | Madani | |
| 6,903,681 B2 | 6/2005 | Faris | |
| 7,249,092 B2 | 7/2007 | Dunn et al. | |
| 7,331,518 B2 | 2/2008 | Rable | |
| 7,333,947 B2 | 2/2008 | Wiebe et al. | |
| 7,357,310 B2 | 4/2008 | Calabrese et al. | |
| 7,533,059 B2 * | 5/2009 | Gattis et al. ............ | 705/40 |
| 2002/0010631 A1 * | 1/2002 | Sato et al. ............ | 705/14 |
| 2002/0052805 A1 * | 5/2002 | Seki et al. ............ | 705/27 |
| 2002/0082995 A1 | 6/2002 | Christie, IV | |
| 2003/0028481 A1 | 2/2003 | Flitcroft et al. | |
| 2003/0135463 A1 | 7/2003 | Brown | |
| 2004/0034598 A1 | 2/2004 | Robinson | |
| 2004/0083394 A1 | 4/2004 | Brebner | |
| 2005/0086692 A1 * | 4/2005 | Dudkiewicz et al. ........ | 725/46 |
| 2005/0246278 A1 | 11/2005 | Gerber et al. | |
| 2006/0006226 A1 | 1/2006 | Fitzgerald et al. | |
| 2006/0010042 A1 | 1/2006 | Gianakis et al. | |
| 2006/0031162 A1 | 2/2006 | Brundage et al. | |
| 2006/0052109 A1 * | 3/2006 | Ashman et al. ............ | 455/440 |
| 2006/0074698 A1 | 4/2006 | Bishop et al. | |
| 2006/0085357 A1 | 4/2006 | Pizarro | |
| 2006/0105742 A1 | 5/2006 | Kim et al. | |
| 2006/0131390 A1 | 6/2006 | Kim | |
| 2007/0089061 A1 * | 4/2007 | Terada ............ | 715/723 |

(Continued)

FOREIGN PATENT DOCUMENTS

EP 1696626 8/2006

(Continued)

OTHER PUBLICATIONS ewallet: users guide and reference Ilium Software Copyright 1997-2008 No specific date recorded.*

(Continued)

*Primary Examiner* — William Rankins
(74) *Attorney, Agent, or Firm* — Fletcher Yoder PC

(57) ABSTRACT

Methods and devices for confirming payment transactions are provided. In one embodiment, an electronic device may include a graphical user interface (GUI) with one or more graphical elements that may be moved by a user to confirm or decline a payment transaction using a selected payment instrument. For example, a user may drag the graphical element to a confirmation position via a touch screen of the electronic device. In another example, a motion sensing device, such as an accelerometer, may sense movement of the electronic device and move the graphical element in response to the motion. Upon confirmation, payment information for the payment transaction may be transmitted to a merchant or payment recipient. Various additional methods, machine-readable media, and devices for confirming payment transactions are provided.

8 Claims, 11 Drawing Sheets

U.S. PATENT DOCUMENTS

| | | | |
|---|---|---|---|
| 2007/0118475 A1 | 5/2007 | Picciallo et al. | |
| 2008/0006685 A1 | 1/2008 | Rackley, III et al. | |
| 2008/0010190 A1 | 1/2008 | Rackley, III et al. | |
| 2008/0010191 A1 | 1/2008 | Rackley, III et al. | |
| 2008/0010193 A1 | 1/2008 | Rackley, III et al. | |
| 2008/0010204 A1 | 1/2008 | Rackley, III et al. | |
| 2008/0016232 A1 | 1/2008 | Yared | |
| 2008/0027844 A1 | 1/2008 | Little et al. | |
| 2008/0040265 A1 | 2/2008 | Rackley, III et al. | |
| 2008/0046362 A1* | 2/2008 | Easterly | 705/40 |
| 2008/0078831 A1 | 4/2008 | Johnson et al. | |
| 2008/0108324 A1 | 5/2008 | Moshir | |
| 2008/0126145 A1 | 5/2008 | Rackley | |
| 2008/0149729 A1* | 6/2008 | Philips | 235/487 |
| 2008/0162346 A1 | 7/2008 | Aaron | |
| 2008/0166998 A1 | 7/2008 | Sun et al. | |
| 2008/0207203 A1 | 8/2008 | Arthur et al. | |
| 2008/0208743 A1 | 8/2008 | Arthur | |
| 2008/0294556 A1* | 11/2008 | Anderson | 705/44 |
| 2009/0098854 A1 | 4/2009 | Park | |
| 2009/0133499 A1* | 5/2009 | Cato | 73/514.16 |
| 2009/0203399 A1* | 8/2009 | Rofougaran | 455/556.1 |

FOREIGN PATENT DOCUMENTS

| | | |
|---|---|---|
| EP | 1696626 A1 * | 8/2006 |
| JP | 2007323613 | 12/2007 |

OTHER PUBLICATIONS

Ilium Software, "Users Guide and Reference: Version 6.1," Jul. 2008 (available electronically at: www.iliumsoft.com/dl/doc/eWallet.pdf (accessed Apr. 9, 2009)).

U.S. Appl. No. 12/351,687, filed Jan. 9, 2009, Casey et al.
U.S. Appl. No. 12/351,649, filed Jan. 9, 2009, Casey et al.
U.S. Appl. No. 12/351,674, filed Jan. 9, 2009, Casey et al.
U.S. Appl. No. 12/351,724, filed Jan. 9, 2009, Casey et al.

* cited by examiner

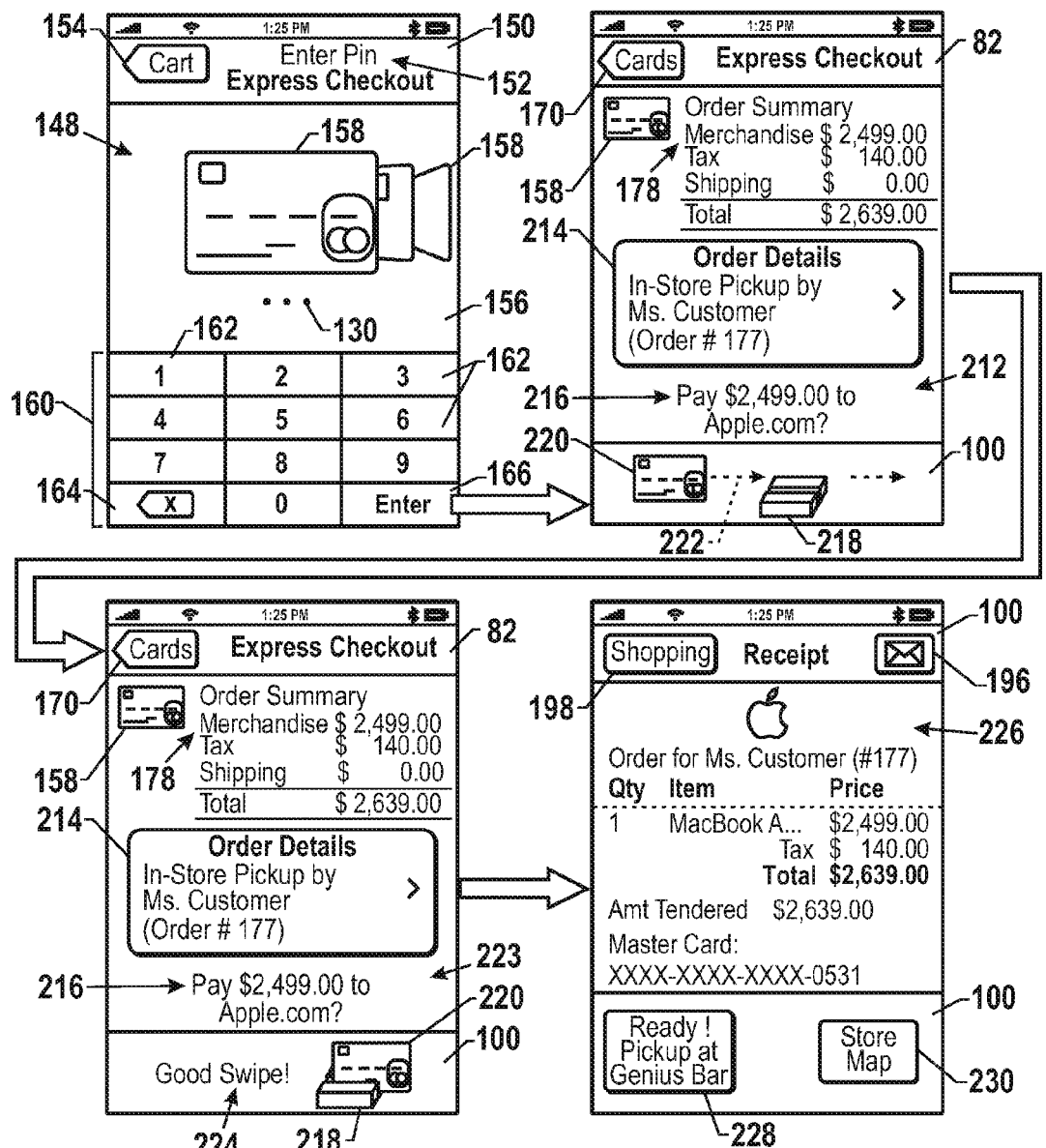
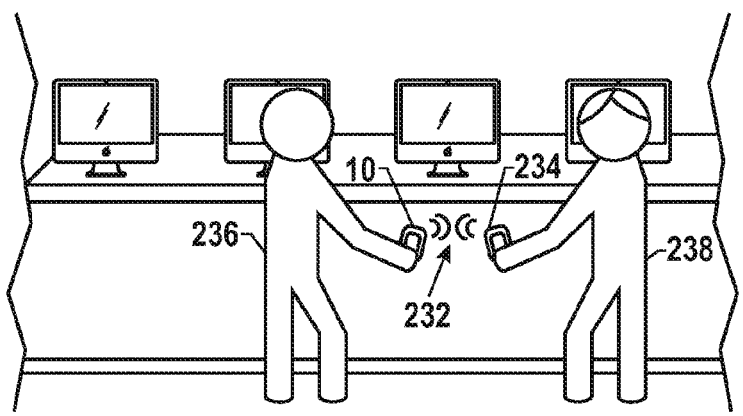
FIG. 8
FIG. 9

MOTION BASED PAYMENT CONFIRMATION

BACKGROUND OF THE INVENTION

1. Field of the Invention

The present invention relates generally to electronic devices, and, more particularly to graphical user interfaces configured to receive motion based inputs for confirming a payment transaction.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Payment transactions increasingly occur without the use of physical payment objects such as credit cards or cash. For example, online purchases may be made using credit card information stored in an online account maintained by a merchant or by a payment service such as PayPal. Further, financial account information may be stored on electronic devices and transferred using contactless means, such as near field communication (NFC), radio-frequency identification (RFID), or networking, to complete payment transactions.

The increased use of electronic and/or contactless payments may allow payment transactions to occur at a fast pace without the need for payment objects. However, due to the speed and virtual nature of modern payment transactions, consumers may not fully appreciate the consequences of authorizing a payment transaction or may inadvertently authorize a payment transaction.

SUMMARY

Certain aspects commensurate in scope with the originally claimed invention are set forth below. It should be understood that these aspects are presented merely to provide the reader with a brief summary of certain forms of the invention might take and that these aspects are not intended to limit the scope of the invention. Indeed, the invention may encompass a variety of aspects that may not be set forth below.

The present disclosure generally relates to techniques for confirming a payment transaction. In accordance with one disclosed embodiment, an electronic device may include a graphical user interface (GUI) with one or more graphical elements that may be moved by a user to confirm or decline a payment transaction. The graphical elements may be configured to virtually represent a swipe of a credit card. For example, in one embodiment, the GUI may display a two position slide bar that may be moved in one direction to confirm the payment transaction and in another direction to decline the payment transaction. In accordance with another embodiment, the GUI may display an image of a credit card that may be moved towards an image of a credit card terminal to confirm the payment transaction.

In certain embodiments, the graphical elements for confirming a payment transaction may be displayed in response to selection of a payment instrument through a touch screen of an electronic device. For example, credit cards may be digitally represented within an electronic wallet or an online payment system. After movement of the graphical elements, the electronic device may transmit a confirmation message to initiate payment with the selected payment instrument. The movable graphical elements may be used to confirm payment transactions in a wide variety of environments such as peer-to-peer transactions, online shopping transactions, and purchases made within brick and mortar stores.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 8 is a view of screens of the device of FIG. 1 illustrating confirmation of an in-store shopping payment in accordance with one embodiment;

FIG. 9 is an illustration of a payment transaction between two electronic devices in accordance with one embodiment;

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for confirming a payment transaction on an electronic device that includes a touch screen. Through the touch screen, a user may select a payment instrument, such as a credit card or debit card, for performing a payment transaction. In certain embodiments, the payment transaction may include purchasing retail goods online or in a brick and mortar store. In other embodiments, the payment transaction may include peer-to-peer transactions where money may be exchanged between private parties.

After selection of a payment instrument, the electronic device may display one or more graphical elements for confirming the payment transaction. In certain embodiments, a user may slide the graphical elements to a confirmation position via the touch screen. In other embodiments, a user may move the device in a specified direction or manner to move the graphical elements to the confirmation position. Upon confirmation, the electronic device may transmit transaction and account information, such as a sender and/or recipient identifier, payment instrument identifier, account number, payment amount, remittance advice details (including, but not limited to, line item details, merchant information, date and time, tax details, and shipping costs), device location, shipping location, billing address, and/or confirmation message, to a merchant or payment recipient to enable processing of the payment transaction. The account and transaction information may optionally be encrypted and/or digitally signed by the merchant's and sender's public keys.

Figure 1:
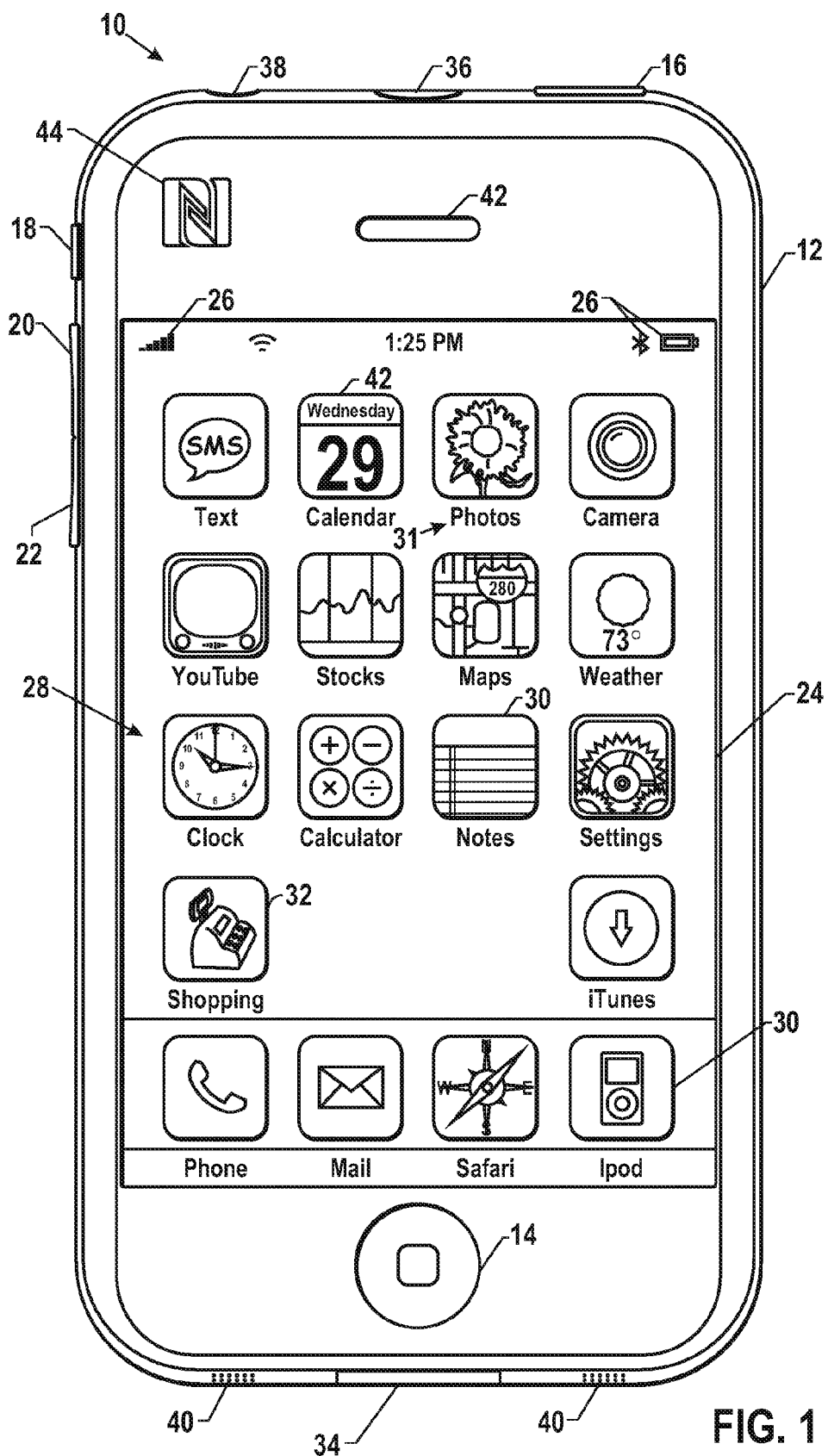
FIG. 1 is a front view of an electronic device in accordance with one embodiment.

FIG. 1 illustrates an electronic device 10 that may make use of the techniques for confirming a payment transaction as described above. It should be noted that while the techniques will be described below in reference to the illustrated electronic device 10 (which may be a cellular telephone, a media player for playing music and/or video, a personal data organizer, or any combination thereof), the techniques described herein are usable with any electronic device that includes a touch screen and GUI. For example, in certain embodiments, the payment confirmation techniques may be employed at an electronic touch-screen kiosk located in a retail store or other location. In other embodiments, the payment techniques may be employed on a desktop computer having a suitable touch-screen or motion-sensing interface.

As illustrated in FIG. 1, the electronic device 10 may be a handheld device incorporating the functionality of one or more portable devices, such as a media player, a cellular phone, a personal data organizer, and so forth. Depending, of course, on the functionalities provided by the electronic device 10, a user may scan articles of merchandise, listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connections, such as Bluetooth and near field communication. By way of example, the electronic device 10 may be a model of an iPod® or iPhone®, or a derivative thereof, available from Apple Inc. of Cupertino, Calif.

In the depicted embodiment, the device 10 includes an enclosure 12 that protects the interior components from physical damage and shields them from electromagnetic interference. The enclosure 12 may be formed from any suitable material such as plastic, metal or a composite material and may allow certain frequencies of electromagnetic radiation to pass through to wireless communication circuitry within the device 10 to facilitate wireless communication.

The enclosure 12 includes user input structures 14, 16, 18, 20, and 22 through which a user may interface with the device. Each user input structure 14, 16, 18, 20, and 22 may be configured to control a device function when actuated. For example, the input structure 14 may include a button that when pressed causes a "home" screen or menu to be displayed on the device. The input structure 16 may include a button for toggling the device 10 between a sleep mode and a wake mode. The input structure 18 may include a two-position slider that silences a ringer for the cell phone application. The input structures 20 and 22 may include buttons for increasing and decreasing the volume output of the device 10. In general, the electronic device 10 may include any number of user input structures existing in various forms including buttons, switches, control pads, keys, knobs, scroll wheels, or other suitable forms.

The device 10 also includes a display 24 that may display various images generated by the device. For example, the display 24 may show photos of merchandise, advertisements, movies, and/or data, such as text documents, work schedules, financial spreadsheets, text messages, and e-mail, among other things. The display 24 also may display system indicators 26 that provide feedback to a user, such as power status, signal strength, call status, external device connection, and the like. The display 24 may be any type of display such as a liquid crystal display (LCD), a light emitting diode (LED) display, an organic light emitting diode (OLED) display, or other suitable display. Additionally, the display 24 may include a touch-sensitive element, such as a touch screen.

The display 24 may be used to display a graphical user interface (GUI) 28 that allows a user to interact with the device. The GUI 28 may include various layers, windows, screens, templates, or other graphical elements that may be displayed in all, or a portion, of the display 24. Generally, the GUI 28 may include graphical elements that represent applications and functions of the device 10. The graphical elements may include icons and other images representing buttons, sliders, menu bars, and the like. In certain embodiments, the user input structure 14 may be used to display a home screen of the GUI 28. For example, in response to actuation of the input structure 14, the device may display graphical elements, shown here as icons 30, of the GUI 28. The icons 30 may correspond to various applications of the device 10 that may open upon selection of a respective icon 30. The icons 30 may be selected via a touch screen included in the display 24, or may be selected by user input structures, such as a wheel or button.

The icons 30 may represent various layers, windows, screens, templates, or other graphical elements that may be displayed in some or all of the areas of the display 24 upon selection by the user. Furthermore, selection of an icon 30 may lead to a hierarchical navigation process, such that selection of an icon 30 leads to a screen that includes one or more additional icons or other GUI elements. Textual indicators 31 may be displayed on or near the icons 30 to facilitate user interpretation of each icon 30. It should be appreciated that the GUI 30 may include various components arranged in hierarchical and/or non-hierarchical structures.

When an icon 30 is selected, the device 10 may be configured to open an application associated with that icon and display a corresponding screen. For example, when the Shopping icon 32 is selected, the device 10 may be configured to open an application for conducting online or in-store shopping. For each application, screens including additional icons or other GUI elements may be displayed on the display 24. The application may present different GUI elements depending on the context and the device's environment. For example, if the device is in motion or in a modal state, the application may perform functions optimized to minimize user interaction. Environmental factors the device may evaluate include the degree or motion or acceleration, ambient light, time of day, location as determined by GPS or other location identification services, ambient/background volume/noise levels, communication channel signal strength, running applications or processes, connected peripherals such as headphones, microphone, or docking station, user interaction with any of the various input methods including the buttons and the touch screen, or the length of time since the aforementioned environmental factors have changed.

The electronic device 10 also may include various input and output (I/O) ports 34, 36, and 38 that allow connection of the device 10 to external devices. The I/O port 34 may be a connection port for transmitting and receiving data files, such as media files or customer order files. For example, the I/O port 34 may be a proprietary port from Apple Inc. In certain embodiments, the I/O port 34 may be used to connect an external scanning device, such as a barcode reader. The I/O port 36 may be a connection slot for receiving a subscriber identify module (SIM) card. The I/O port 38 may be an audio jack for connecting headphones or external speakers. In other embodiments, the device 10 may include any number of I/O ports configured to connect to a variety of external devices, including but not limited to a power source, a printer, a computer, and an intermediate device, such as a dock, for communicating with an external server. In certain embodiments, multiple ports may be included on the device. The ports may support any interface type, such as a universal serial bus (USB) port, serial connection port, Firewire port, IEEE-1394 port, or AC/DC power connection port.

The electronic device 10 may also include various audio input and output structures 40 and 42. For example, the audio input structures 40 may include one or more microphones for receiving voice data from a user. The audio output structures 42 may include one or more speakers for outputting audio data, such as data received by the device 10 over a cellular network. Together, the audio input and output structures 40 and 42 may operate to provide telephone functionality. Further, in some embodiments, the audio input structures 40 may include one or more integrated speakers serving as audio output structures for audio data stored on the device 10. For example, the integrated speakers may be used to play music stored in the device 10.

The device 10 may further include a near field communication (NFC) device 44. The NFC device 44 may be located within the enclosure 12, and a mark or symbol on the exterior of the enclosure 12 may identify its location within the enclosure 12. The NFC device 44 may allow for close range communication at relatively low data rates (424 kb/s), and may comply with standards such as ISO 18092 or ISO 21481, or it may allow for close range communication at relatively high data rates (560 Mbps), and may comply with the TransferJet® protocol. In certain embodiments, the communication may occur within a range of approximately 2 to 4 cm. Close range communication with the NFC device 44 may take place via magnetic field induction, allowing the NFC device 44 to communicate with other NFC devices or to retrieve information from tags having radio frequency identification (RFID) circuitry. As discussed below, the NFC device 44 may provide a manner of connecting to a shopping website and communicating with an external server.

Figure 2:
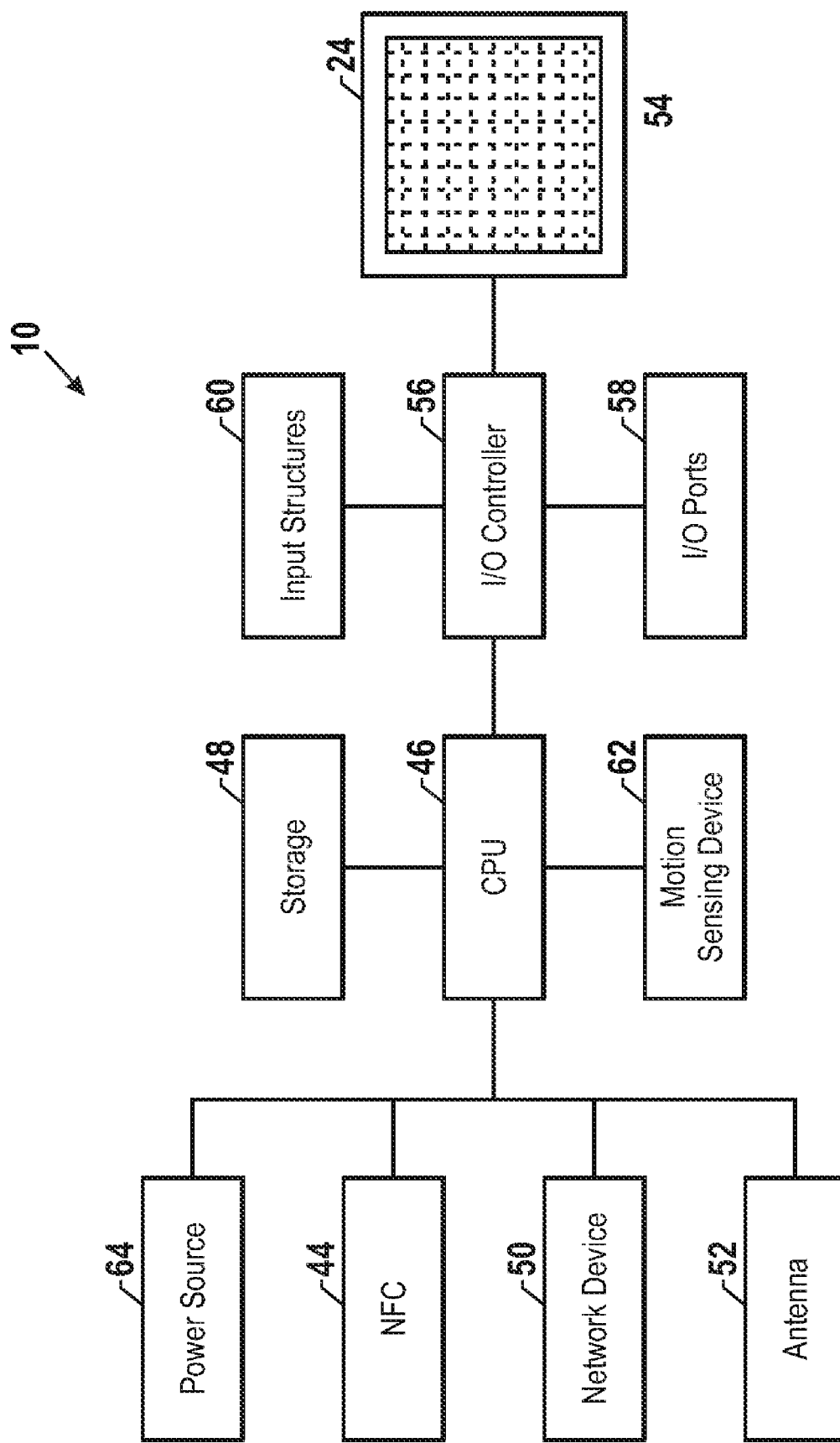
FIG. 2 is a simplified block diagram of the device of FIG. 1 in accordance with one embodiment.

Additional details of the illustrative device 10 may be better understood through reference to FIG. 2, which is a block diagram illustrating various components and features of the device 10 in accordance with one embodiment of the present invention. The block diagram includes the display 24 and the NFC interface 44 discussed above, as well as many other components.

The operation of the device 10 may be controlled by a central processing unit (CPU) 46 that provides the processing capability required to execute the operating system, programs, GUI 28, and any other functions of the device 10. The CPU 46 may include a single processor or it may include a plurality of processors. For example, the CPU 46 may include "general purpose" microprocessors, a combination of general and special purpose microprocessors, instruction set processors, graphics processors, video processors, and/or related chips sets, and/or special purpose microprocessors. The CPU 46 also may include on board memory for caching purposes.

Information used by the CPU 46 may be located within long-term storage 48. The long-term storage 48 of electronic device 10 may be used for storing data required for the operation of the CPU 46 as well as other data required by the device 10. For example, the storage 48 may store the firmware for the electronic device 10 that is used by the CPU 46. The firmware may include an operating system, as well as other programs that enable various functions of the electronic device 10, GUI functions, and/or processor functions. The storage 48 also may store components for the GUI 28, such as graphical elements, screens, and templates. Additionally, the long term storage 48 may store data files such as media (e.g., music and video files), image data, software, preference information (e.g., media playback preferences), financial account information, wireless connection information (e.g., information that may enable the device 10 to establish a wireless connection, such as a telephone connection), subscription information (e.g., information that maintains a record of podcasts, television shows or other media to which a user subscribes), telephone information (e.g., telephone numbers), and any other suitable data. The long term storage 48 may be non-volatile memory such as one or more of a read only memory, flash memory, a hard drive, or any other suitable optical, magnetic, or solid-state computer readable media, as well as a combination thereof.

One or more network devices 50 may provide additional connectivity channels for receiving and transmitting information. The network device 50 may represent, for example, one or more network interface cards (NIC) or a network controller. The network device 50 may include a local area network (LAN) interface for connecting to a wired Ethernet-based network and/or a wireless LAN, such as an IEEE 802.11x wireless network. In certain embodiments, the NFC interface 44 may be used to receive information, such as the service set identifier (SSID), channel, and encryption key, used to connect to the LAN.

The network device 50 also may include a wide area network (WAN) interface that permits connection to the Internet via a cellular data network, such as the Enhanced Data rates for GMS Evolution (EDGE) network or the 3G network. The network device 50 may coordinate with one or more antennas 52 to transmit and receive radio frequency signals of a cellular network. Further, the network device 50 may include a personal area network (PAN) interface for connecting to a Bluetooth® network, an IEE 802.15.4 (ZigBee) network, or an ultra wideband network (UWB). The network device 50 may include any number and combination of network interfaces. As will be appreciated, the network device may employ one or more protocols, such as the High-Speed Downlink Packet Access (HSDPA) protocol, for rapidly downloading data over a network. Additionally, the network device 50 may allow the device 10 to receive a software upgrade that enables the device 10 to receive motion based inputs in accordance with certain embodiments.

In certain embodiments, the device 10 may use a device identification networking protocol to establish a connection with an external device through a network interface. For example, both the device 10 and the external device may broadcast identification information using Internet protocol (IP). The devices may then use the identification information to establish a network connection, such as a PAN connection or a LAN connection, between the devices. By way of example, the device identification protocol may be Bonjour® by Apple Inc.

Information received through the network device 50, as well as information contained in the storage 48, may be displayed on the display 24. As noted above, a user may select information to display through the GUI 28 (FIG. 1). A touch screen 54 may be positioned in front of or behind the display 24 and may be used to select graphical elements, such as the icons 30 (FIG. 1), shown on the display 24. Further, the touch screen may be used to move graphical elements shown on the display 24 to confirm a payment transaction. The touch screen 54 is configured to generate an input based on a user's or object's touch and to send the information to the CPU 46, which interprets the touch event and performs a corresponding action. The touch screen 54 may employ any suitable type of touch screen technology such as resistive, capacitive, infrared, surface acoustic wave, electromagnetic, or near field imaging. Furthermore, the touch screen 54 may employ single point or multipoint sensing.

An input/output (I/O) controller 56 may provide the infrastructure for exchanging data between the CPU 46 and input/output devices, such as the touch screen 54 and the display 24. The I/O controller 38 may contain one or more integrated circuits and may be integrated with the CPU 46 or exist as a separate component. The I/O controller 56 also may provide the infrastructure for communicating with external devices through the I/O ports 58. The I/O ports 58 may include the I/O ports 34, 36, and 38 shown in FIG. 1 and may be used for connecting the device 10 to an external computer, a printer, audio headphones, or the like.

As noted above, a user may navigate through the GUI 28 (FIG. 1) using the input structures 60 located on external surfaces of the device 10. The user input structures 60 may include the input structures 14, 16, 18, 20, and 22 shown in FIG. 1 and may communicate with the CPU 46 through the I/O controller 56. The user input structures 60 may be used in conjunction with, or independently of, the touch screen 54 to select inputs for the device 10.

In addition to receiving user input through the input structures 60 and the touch screen 54, the device 10 may include a motion sensing device 62 for receiving user input. The motion sensing device 62 may be any device configured to measure motion or acceleration, such as an accelerometer or a gyroscope. In one embodiment, the motion sensing device 40 may be a three-axis accelerometer that includes a sensing element and an integrated circuit interface for providing the measured acceleration and/or motion data to the CPU 46. The motion sensing device 62 may be configured to sense and measure various types of motion including, but not limited to, velocity, acceleration, rotation, and direction.

Motion data acquired by the motion sensing device 62 may be used to confirm a payment transaction. As discussed further below, the motion sensing device 62 may be configured to sense motion of the device 10 and transmit motion data to the CPU 46 to adjust one or more graphical elements shown on the display 24. For example, a graphical element, such as a slide bar, may be moved across the display 24 in response to sensed motion. In certain embodiments, the position of the graphical element may be used to confirm or decline a payment transaction.

The device 10 may be powered by a power source 64 that may include one or more batteries and, or alternatively, and AC power source, such as provided by an electrical outlet. In certain embodiments, the device 10 may include an integrated power source that may include one or more batteries, such as a Li-Ion battery, which may be user-removable or secured to the enclosure 12. In certain embodiments, a proprietary connection I/O port may be used to connect the device 10 to a power source for recharging the battery.

Figure 3:
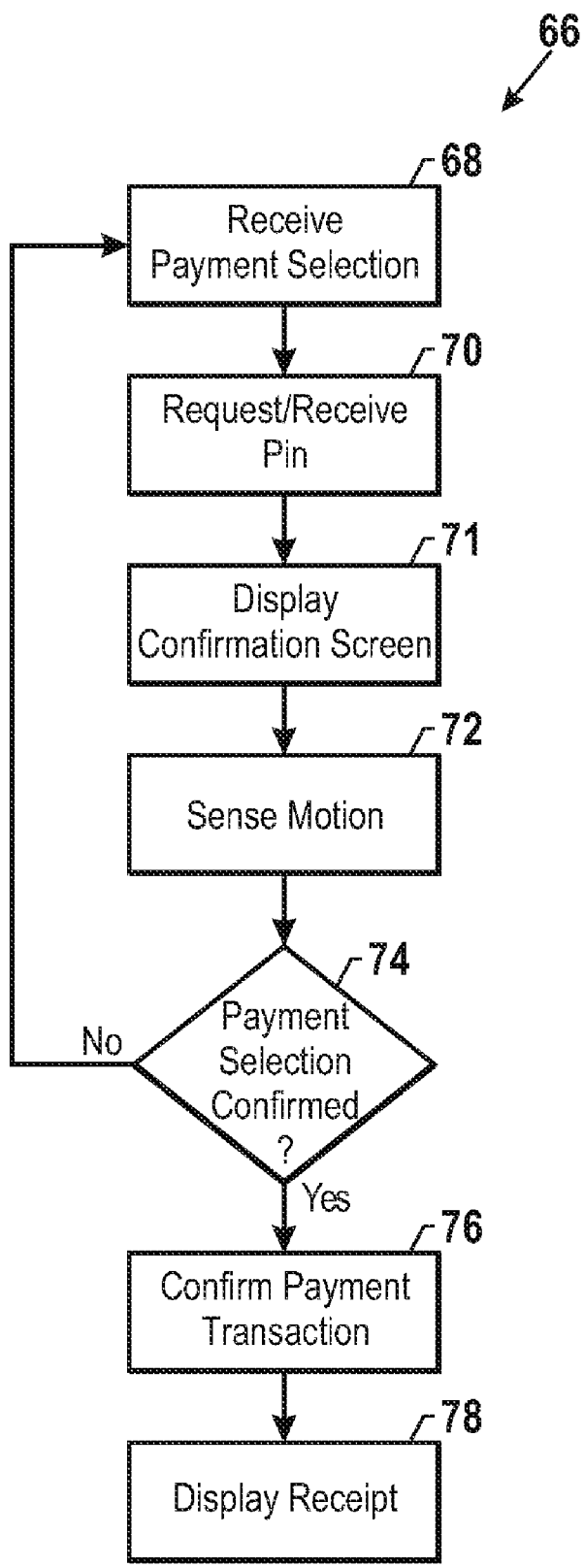
FIG. 3 is a flowchart depicting a method for confirming a payment transaction in accordance with one embodiment.

FIG. 3 is a flowchart depicting an exemplary method 66 for confirming a payment transaction using the electronic device 10. The method 66 may be employed to confirm payments for various types of monetary transactions including, but not limited to, purchasing goods or services from an online or brick and mortar store, paying for goods or services received in person but outside of a store (such as paying for a pizza delivery order), exchanging money between peers, and exchanging or returning previous purchases.

The method 66 may begin by receiving (block 68) a payment selection that identifies a financial account for making or receiving a payment. The payment selection may be received through the touch screen 54 (FIG. 2) of the electronic device 10. For example, a user may access an electronic wallet or payment service, such as Google Checkout or PayPal, through the electronic device 10 to display available payment options. The electronic wallet or payment service may store financial account information for payment instruments, such as credit cards, debit cards, pre-paid or gift cards, checking accounts, and/or savings accounts, that may be presented to a user through the electronic device 10 upon accessing the electronic wallet or payment service. In certain embodiments, the electronic wallet may be an electronic wallet in accordance with the teachings of the commonly assigned U.S. patent application Ser. No. 12/351,649, entitled "Electronic Wallet System and Method," to Brandon Casey et al., filed on the same date as the present application, the entirety of which is herein incorporated by reference for all purposes.

Further, in certain embodiments, the device may display an electronic wallet or payment service in response to receiving information through the network device 50, the NFC device 44, or other input structure such as a camera, or bar code reader. For example, the electronic device 10 may display a specific payment service in response to receiving information in an SMS message or reading information from an NFC tag. The received information may include a request for payment as well as information for selecting a payment service and processing a payment transaction. For example, the information may include a handler identifier that specifies a payment service, electronic wallet application, or plug-in that may be used for the payment transaction. The information also may identify suitable payment methods, such as types of credit cards, prepaid cards, and bank accounts that may be selected to complete the payment transaction. Further, the information may include connectivity information such as supported devices, supported functionalities, and supported security protocols. In response to receiving the information, the device 10 may select and launch a payment service or electronic wallet application. In certain embodiments, the device 10 may select and launch the payment service or electronic wallet application using control logic stored within the storage 48 or CPU 46.

Upon accessing a payment service or electronic wallet, the electronic device 10 may display account information and/or virtual representations of available payment instruments through the GUI 28 (FIG. 1) of the device 10. A user may then select a payment instrument by tapping a corresponding graphical element on the touch screen 54 (FIG. 2) of the device 10. In certain embodiments, a personal identification number (PIN), password, or other type of identifier, may be associated with a payment instrument. In these embodiments, upon selection of the payment instrument, the device 10 may request (block 70) a PIN to verify the payment instrument. In certain embodiments, the device 10 may display a virtual keypad for entering the PIN through the GUI 28 of the electronic device 10.

After the PIN has been entered, the device 10 may display (block 71) a confirmation screen. Of course, in certain embodiments, a PIN may not be required and block 70 may be omitted. In these embodiments, a confirmation screen may be displayed in response to receiving (block 68) a payment selection. The confirmation screen may be part of the GUI 28 (FIG. 1) and may include a summary that describes the payment transaction by displaying information such as the price, shipping cost, tax, and/or goods or services involved in the payment transaction. The confirmation screen also may include one or more graphical elements that may be moved (such as moved laterally) by a user to confirm the payment transaction. In certain embodiments, the graphical elements may be configured to represent a virtual swipe of a credit card.

The method may continue by sensing (block 72) motion. The device 10 may sense motion through the touch screen 54 (FIG. 2) or through the motion sensing device 62 (FIG. 2). For example, a user may contact a graphical element on the touch screen 54 and slide the graphical element to a confirmation position shown on the device 10 to confirm the payment transaction. The touch screen 54 may sense motion as a user's finger or pointing object moves across the touch screen 54. The touch screen 54 also may sense motion by detecting levels of pressure exerted by a user's finger or object on the touch screen 54. In another example, the device 10 may sense motion of the electronic device 10 through the motion sensing device 62. For example, in one embodiment, a user may move the electronic device 10 to the right to confirm a payment transaction. The motion sensing device 62 may sense motion as the device 10 moves.

As the device 10 senses motion, either through the touch screen 54 or the motion sensing device 62, the device 10 may acquire motion data corresponding to the sensed motion. In certain embodiments, the motion data may represent direction, distance, velocity, and/or the location of the graphical elements, among other things. The device 10 may use the motion data to determine (block 74) whether the payment selection was confirmed. For example, the CPU 46 (FIG. 2) of the device 10 may determine whether a graphical element was moved to a certain position on the touch screen to confirm the payment selection. For example, the CPU 46 may determine whether the acquired motion data indicates a direction and distance associated with moving the graphical element to a confirm position. If the device 10 determines that the payment selection was not confirmed, the device 10 may return to displaying available payment instruments and be ready to receive (block 68) a payment selection.

If the device 10 determines that the payment selection was confirmed, the device 10 may then confirm (bock 76) the payment transaction by transmitting payment information to a merchant, payee, financial institution or service responsible for processing the payment. For example, the device 10 may transmit payment information, such as a confirmation message indicating that the payment transaction has been confirmed, to a payment service, such as PayPal. Upon receiving the confirmation message, the payment service may begin processing the payment. In another example, the confirmation message may be transmitted to the financial institution that issued the selected payment instrument. In certain embodiments, the confirmation message may be transmitted to the financial institution through the payment recipient. For example, the electronic device 10 may transmit the payment information to a store's server for subsequent transmission to the financial institution.

In addition to or instead of a confirmation message, the payment information may include other types of transaction and/or account information, such as a sender and/or recipient identifier, payment instrument identifier, account number, payment amount, remittance advice details (including, but not limited to, line item details, merchant information, date and time, tax details, and shipping costs), device location, shipping location, billing address, and/or confirmation message, to a merchant or payment recipient to enable processing of the payment transaction. For example, in an embodiment where financial account information for the selected payment instrument is stored on the electronic device 10, for example within the long-term storage 48 (FIG. 2), the device 10 may confirm the payment transaction by transmitting account information, such as the account number, to the merchant and/or to the financial institution. However, in other embodiments, a financial institution, such as a payment service, may already have the financial account information. In these embodiments, the payment information may include a unique identifier, authorization key, or encrypted message that enables the financial institution to retrieve the financial account information. To confirm the payment transaction, the payment information may be transmitted using the network device 50 (FIG. 2) or the NFC device 44 (FIG. 2). Further, as noted above, the payment information may be encrypted and/or digitally signed by the merchant's and sender's public keys.

After the payment transaction has been confirmed, the device 10 may receive and display (block 78) a receipt for the payment transaction. For example, the receipt may identify the amount tendered, the payment recipient, and the payment instrument used to complete the payment transaction. In certain embodiment, the receipt may be stored within an electronic wallet application included on the device 10.

FIGS. 4-13 further illustrate methods of confirming a payment transaction using the electronic device 10. Many of these figures illustrate various screens that a user of the electronic device 10 may encounter while confirming a payment transaction. The screens may be part of the GUI 28 (FIG. 1) and may be navigated using the touch screen 54 (FIG. 2) and/or the user input structures 14, 16, 18, 20, and 22 (FIG. 1) of the electronic device 10. As may be appreciated, the functionality described may be achieved with a wide variety of graphical elements and visual schemes. Therefore, the screens shown in the following figures are not intended to be limiting. Other embodiments may include a wide variety of user interface styles and the precise user interface conventions shown herein are provided by way of example only.

Figure 4:
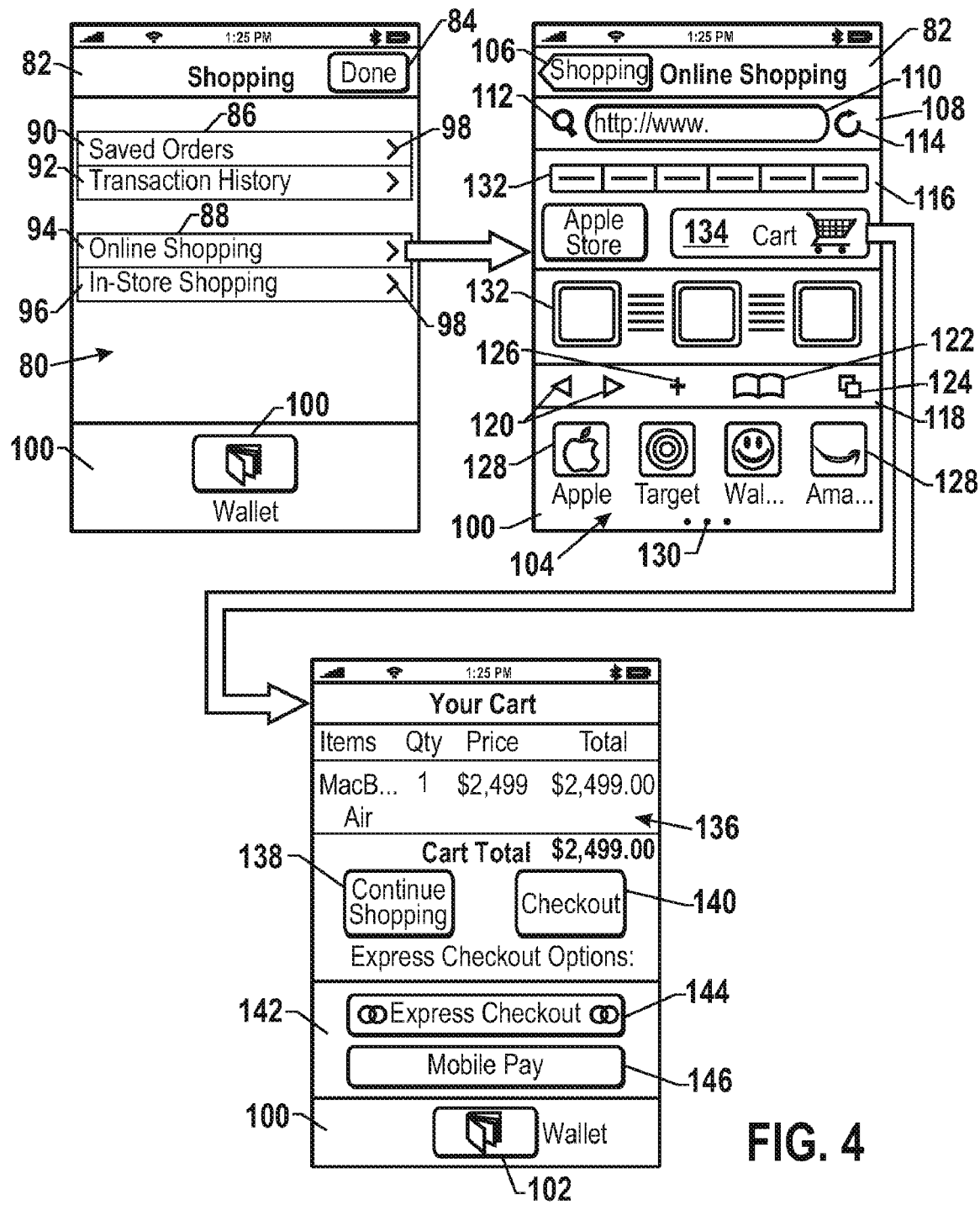
FIG. 4 is a view of screens of the device of FIG. 1 illustrating an online shopping transaction in accordance with one embodiment.

FIG. 4 illustrates a series of screens for creating payment transactions using the electronic device 10. A shopping application may be accessed through selection of the shopping icon 32 shown in FIG. 1 and may include a screen 80 that serves as the main menu. The screen 80 includes a title bar 82 indicating the current state of the device 10. As shown on the screen 80, the device 10 is currently running the shopping application. The screen 80 also includes several graphical elements 84, 86, and 88 that allow navigation within the shopping application. For example, the graphical element 84 may correspond to a done button that when selected may return the user to the home screen shown in FIG. 1. The user may select the button 84 to exit the shopping application.

The graphical elements 86 and 88, shown here as display windows, allow navigation through the shopping application. Each display window 86 and 88 includes selection bars 90, 92, 94, and 96 that may be selected to access different parts of the shopping application. Specifically, selection of the saved orders selection bar 90, may display a screen showing previous orders that have been made but not yet purchased. In certain embodiments, the selection bar 90 may be selected to view a saved order and confirm a payment transaction using techniques similar to those illustrated in FIG. 5. The transaction history selection bar 92 may be selected to view previous payment transactions made using the electronic device 10. In certain embodiments, payment transactions confirmed using the electronic device 10 may be stored within the long-term storage 48 (FIG. 2) and accessed through the selection bar 92.

The selection bars 94 and 96 may be selected to conduct online or in store shopping, respectively. Specifically, the online shopping selection bar 94 may be selected to access a website for conducting online shopping, while the in store shopping selection bar 96 may be selected to conduct shopping using the electronic device 10 while in a brick and mortar retail store. Each selection bar 90, 92, 94, and 96 includes arrows 98 that indicate that additional screens may be accessed by selecting the selection bars 90, 92, 94, and 96.

The screen 80 also includes a summary bar 100 displaying an icon 102 representing an electronic wallet that may be accessed through the electronic device 10. As described above with respect to FIG. 3, the electronic wallet may store financial account information for payment instruments that a user that may select to pay for shopping or other payment transactions. In certain embodiments, the financial account information may be stored on the electronic device or accessed thorough a third party service provider. In certain embodiments, the icon 102 may be used to access an electronic wallet application as previously described.

In response to selection of the online shopping selection bar 94, the electronic device 10 may display a screen 104 for conducting online shopping. Within the title bar 82, a graphical element 106 may be selected to return to the shopping application main screen 80. The screen 104 also includes an Internet navigation bar 108 that may be used to search for and navigate to online shopping sites using a web browser included on the electronic device 10. For example, a search term or web address may be typed into the entry area 110 and displayed by selecting a graphical element 112. A graphical element 114 may be selected to refresh the Internet page.

The screen 80 also includes a display area 116 that shows the currently entered website. A lower navigation bar 118 includes several graphical elements 120, 122, 124, and 126 for navigating within the web browser. Specifically, the graphical elements 120 may be used to navigate to previous and subsequent web pages. The graphical element 122 may be used to view and access bookmarks stored within the electronic device, and the graphical element 124 may be used to access other web pages that are currently open on the electronic device 10.

The graphical element 126 may be used to create bookmarks and to add or create shopping icons 128 that may be selected to access frequently used online shopping websites. In certain embodiments, some shopping icons 128 may be preloaded onto an electronic device 10 by the device manufacturer. Indicators 130 shown below the icons 128 indicate that a user may scroll to the right or left of the lower summary bar 100 to access additional shopping icons 128.

Selection of one of the shopping icons 128 may cause the corresponding website to be displayed within the display area 116. The website may include graphical elements 132 that may be selected to navigate through the website and to select items for purchase. After all items have been selected, a user may select the graphical element 134 to access a virtual shopping cart and view items in the current order.

In response to selection of the graphical element 134, the electronic device 10 may display an order summary screen 136 detailing the items in the virtual shopping cart, as well as the item quantity and amount due, among other things. If the user is not ready to checkout, she may select a graphical element 138 to continue shopping. However, if the user is ready to checkout, the user may select a graphical element 140 to initiate a payment transaction. In certain embodiments, selection of the graphical element 140 may display subsequent screens for entering account information for a payment instrument.

The order summary screen 136 also includes a display area 142 with graphical elements 144 and 146 that may be used to select express checkout options. In certain embodiments, the express checkout options may include payment through payment service providers, such as MobilePay, available from Apple Inc., MasterCard Express Checkout, Google Checkout, or PayPal. In certain embodiments, the payment service providers may maintain a user's financial account information on an external server and a user may be required to enter login information to access her account. In addition to paying using express checkout options, a user may select the icon 102 to pay for the order using her electronic wallet.

Figure 5:
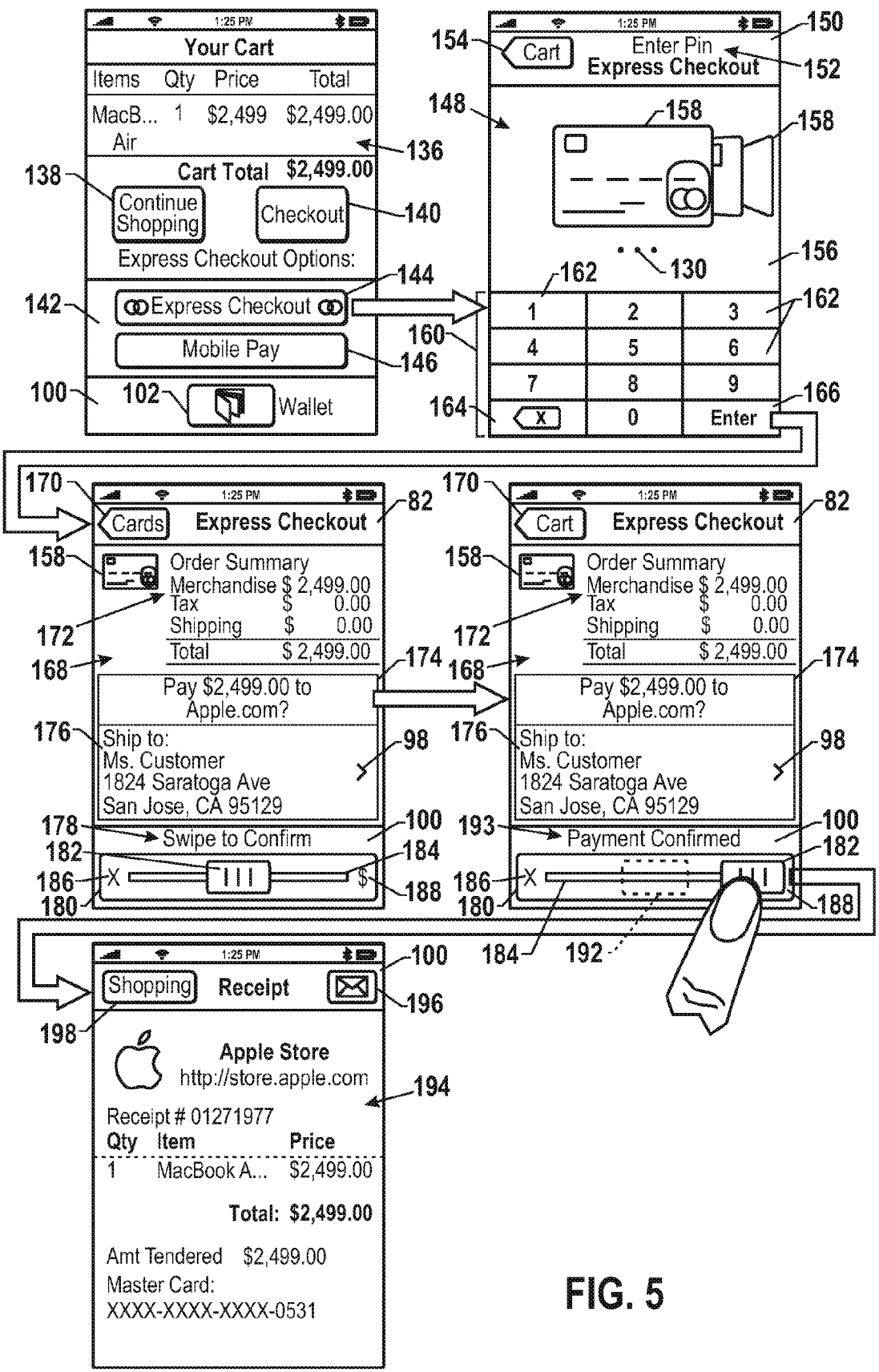
FIG. 5 is a view of screens of the device of FIG. 1 illustrating confirmation of an online shopping payment through a touch screen in accordance with one embodiment.

FIG. 5 illustrates a series of screens for confirming a payment transaction. As discussed above with respect to FIG. 4, the order summary screen 136 includes the graphical elements 140, 144, 146, and 142 for initiating a payment transaction. In response to selection of one of these graphical elements, the device may display a PIN entry screen. For example, selection of the express checkout graphical element 144 may display a screen 148 for selecting a payment instrument and entering a PIN. The screen 148 includes a title bar 150 with instructions 152 directing a user to enter a PIN corresponding to a selected payment instrument, such as a credit card. The title bar 150 also includes a graphical element 154 that may be selected to return to the order summary screen 136.

A display window 156, shown on the screen 148, includes several images 158 of payment instruments that may be selected by a user to pay for the sales order. As described above, the financial account information corresponding to the payment instruments may be maintained by a payment service provider. Using the touch screen 54 (FIG. 2), a user may select an image 158 to identify a payment instrument for the sales transaction. As represented by the indicators 130, additional images 158 may be accessed by scrolling through the card images 158.

After a card image 158 has been selected, a user may enter a PIN corresponding to the selected payment instrument through a keypad 160. Keys or buttons 162 of the keypad 160 may be used to enter a PIN or password for an identified payment instrument. The keypad 160 also may include a delete key 164 for removing an existing entry. After the PIN has been entered, a user may select the enter key 166 to submit the PIN and display a confirmation screen 168. In certain embodiments, the keypad 160 may be randomly organized to provide enhanced security during entry of the PIN. For example, in one embodiment the keypad 160 may be randomly organized in accordance with the teachings of the commonly assigned U.S. patent application Ser. No. 12/286,313, entitled "Systems and Methods for Secure Wireless Transactions," to Michael Rosenblatt et al., filed on Sep. 30, 2008, the entirety of which is herein incorporated by reference for all purposes.

In certain embodiments, a PIN or password may not be required. In these embodiments, the keypad 160 may be omitted and selection of a card image 158 may cause the confirmation screen 168 to be displayed. Further, in certain embodiments, the organization of the keypad and/or the password and pin entry conditions may be customizable by a user. For example, a user may set the device to employ an optionally randomized keypad.

The confirmation screen 168 includes an order summary section 172 that displays details about the sales order, such as the item price, tax, and shipping costs. In certain embodiments, the order summary section 172 may be selected to display additional details about the order. The confirmation screen 168 also includes a display window 174 with a selection bar 176 displaying the shipping information for the order. In certain embodiments, the shipping information may be associated with the selected payment instrument and retrieved by the device 10. The selection bar 176 may be selected to view further details about the shipping information and/or edit the shipping information.

The display window 174 also includes a prompt asking a user to confirm the payment transaction. In certain embodiments, the prompt may identify the amount of the transaction and the payment recipient, among other things. The confirmation screen 168 also may display an image 158 of the selected payment instrument. Instructions 178 located in the lower summary bar 100 may prompt the user to move a graphical element 180 to confirm the payment transaction. The depicted graphical element 180 includes a slide bar 182 that may be moved to the right or to the left using the touch screen 54 (FIG. 2). The slide bar 182 may slide along a track 184 between a decline position 186 and confirmation position 188. Specifically, a user may drag the slide bar to the left to the decline position 186 to decline the payment or the user may drag the slide bar 182 to the right to the confirmation position 188 to confirm the payment transaction.

In certain embodiments, the device 10 may be configured to move the slide bar in response to detecting a specified level of pressure through the touch screen 54. For example, the device 10 may be configured to move the slide bar in response to sensing a level of pressure that exceeds a minimum pressure level stored within the device 10 or that falls within a range of pressure levels stored within the device 10. In certain embodiments, the minimum pressure level or range of pressure levels may be customizable by a user to provide additional safeguards against inadvertent payment confirmations.

In certain embodiments, the graphical element 180 and associated motion based input by the user may operate together to provide a motion based confirmation for a payment transaction. The motion based confirmation is intended to provide a verification step that may reduce inadvertent payment confirmations. Further, the motion based confirmation may impress upon a user the significance of the payment transaction. Of course, in other embodiments, the graphical elements 180 and 184 may represent different symbols and shapes arranged in various configurations. For example, the graphical element 184 may be replaced by arrows instructing a user to move the graphical element 182 in a vertical or diagonal direction or along a curve. Further, the graphical elements 182 and 184, the decline position 186, and the confirmation position 188, may be located in different areas of the confirmation screen 168.

The graphical element 182 may move across the confirmation screen 168 when the graphical element 182 is dragged by a user using the touch screen 54. For example, a user may use her finger 190, or another object, to move the graphical element 182 from a center position 192 to the confirmation position 188. In response to, or contemporaneously with, the movement, the device 10 may display a message 193 indicating that the payment has been confirmed. When the graphical element 182 reaches the confirmation position 188, the device 10 may transmit payment information to confirm the payment transaction. As described above with respect to FIG. 3, the payment information may include a confirmation message, financial account information, an account identifier, a device identifier, or combinations thereof.

After confirming the payment transaction, the device 10 may display a receipt screen 194. The receipt screen 194 may include an electronic receipt for the payment transaction that may describe the items purchased, the amount tendered, the payment instrument, and other information related to the payment transaction. The receipt screen 194 also may include a graphical element 196 that may be selected to email the electronic receipt to an email account. In other embodiments, the electronic receipt may be stored within an electronic wallet. From the receipt screen 194, a graphical element 198 may be selected to return to the shopping application main menu 80 (FIG. 4) to continue shopping.

Figure 6:
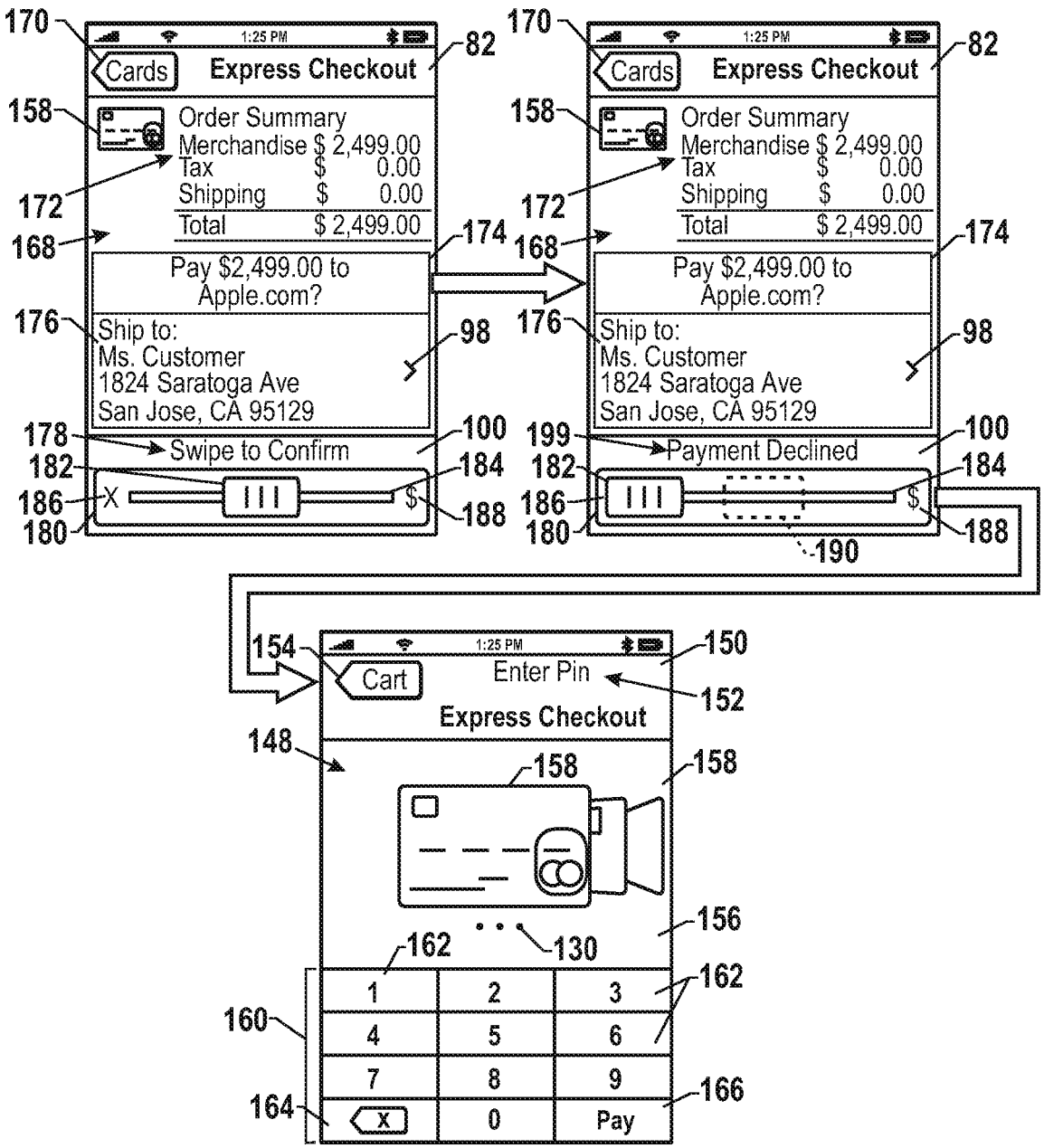
FIG. 6 is a view of screens of the device of FIG. 1 illustrating rejection of an online shopping payment in accordance with one embodiment.

FIG. 6 illustrates a series of screen for declining a payment transaction using the electronic device 10. As described above with respect to FIG. 5, the confirmation screen 168 may be displayed after selection of the payment instrument represented by the image 158. From the confirmation screen 168, a user may drag the slide bar 182 to the left from the center position 190 to the decline position 186. In response to, or contemporaneously with, the movement, the device 10 may display a message 199 indicating that the payment has been declined. After the payment has been declined, the device may display the payment selection screen 148 to allow a user to select another payment instrument to complete a payment transaction.

Figure 7:
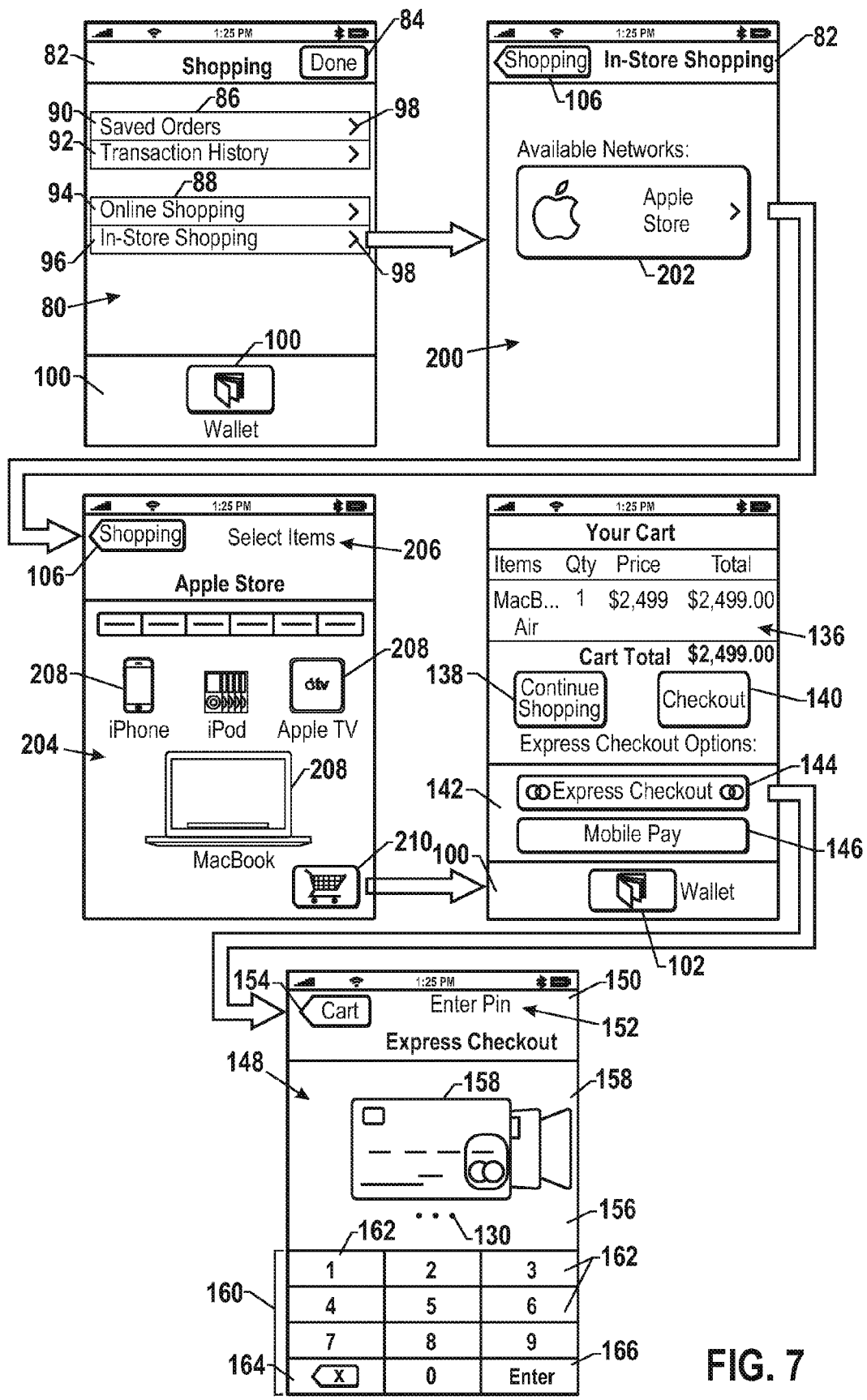
FIG. 7 is a view of screens of the device of FIG. 1 illustrating an in-store shopping transaction in accordance with one embodiment.

FIG. 7 illustrates a series of screens for creating a payment transaction while shopping in a store. From the shopping application main menu 80, a user may select the in-store shopping selection bar 96 to cause the device to display an in-store shopping screen 200. A graphical element 106 may be selected to return to the main menu 80. The screen 200 may display available networks that may be used to conduct shopping at a retail store. In certain embodiments, the available networks may represent LANs maintained by retail stores that may be detectable by the device 10 when the device 10 is in close proximity to the retail stores. The available networks may be shown within one or more display windows 202. As shown, the device 10 has detected a network for an Apple Store®. The display window 202 may be selected to connect to the network and begin shopping at the Apple Store®.

Upon selection of the display window 202, the device 10 may connect to the network, for example through the network device 50 (FIG. 2), and display an in-store shopping screen 204. In certain embodiments, the in-store shopping screen 204 may be part of an in-store shopping application provided by the store. The screen 204 includes instructions 206 that prompt a user to select items for purchase. A user may return to the shopping main menu by selecting graphical element 106.

The screen 204 includes several graphical elements 208 that may be selected to navigate within the site and select items for purchase. After a user is finished selecting items, the user may select a graphical element 210 to view the order summary screen 136. As described above with respect to FIG. 4, the order summary screen 136 may describe the items in the order, as well as the item quantity and amount due. From the order summary screen 136, the user may select a graphical element 102, 140, 144, or 146 to initiate the payment transaction. For example, a user may select the graphical element 144 to display the selection screen 148. From the screen 148, a user may select a payment instrument for the payment transaction and enter a PIN if required. Depending on the type of checkout method selected, the screen 148 may include various configurations, graphical elements, and keypads for selecting payment instruments and entering PINS or other verification codes.

FIG. 8 illustrates a series of screens for confirming a payment transaction in an in-store shopping context. The payment confirmation process may be generally similar to the payment confirmation process used in the online shopping context described above with respect to FIGS. 4-5. From the selection screen 148, a user may select an image 158 of a payment instrument and enter a corresponding PIN, if required. After entry of the PIN, the device 10 may display a confirmation screen 212. The confirmation screen may include an image 158 of the selected payment instrument, as well as the order summary 178 describing the order. The confirmation screen 212 also may include a display window 214 further describing details of the order, such as the pickup method and the name of the customer. In certain embodiments, the display window 214 may be selected to enter or edit pickup details. For example, a user may wish to be notified via email, text message, or cellular telephone when the order is available for pickup. In other embodiments, a user may schedule pickup at a designated time or have certain items shipped to the user's home.

The confirmation screen 212 also includes a prompt 216 asking a user to confirm the payment transaction. The lower summary bar 100 includes graphical elements 218, 220, and 222 that may be used to confirm the payment. Specifically, the graphical element 218 represents a credit card terminal, and the graphical element 220 represents a payment instrument, such as a credit card, selected by the user for payment. The graphical element 222 indicates the direction of movement required to confirm the payment. Together, the graphical elements 218, 220, and 222 may represent a virtual credit card swipe. Specifically, a user may move the image of the payment instrument 220 to the image of the credit card terminal 218 to confirm the payment transaction. If the user does not wish to confirm the transaction, the user may select the graphical element 170 within the title bar 82 to return to the selection screen 148.

If the user confirms the transaction by moving the graphical element 220 to the graphical element 218, the device 10 may display a screen 223 that includes a message 224 indicating that the virtual credit card swipe was completed successfully. The lower summary bar 100 also may show the image of the credit card 220 as having passed through the image of the credit card terminal 218. Of course, in other embodiments, the graphical elements 220 and 218 may take on various forms to represent other types of payment instruments and credit card terminals or point of purchase terminals.

After the swipe is complete, the device 10 may transmit payment information to confirm the payment transaction as described above with respect to FIG. 3. The device 10 may then display a receipt screen 226 showing an electronic receipt for the payment transaction. The graphical element 196 may be selected to email the receipt to an email address. The receipt screen 226 also includes graphical elements 228 and 230 within the lower summary bar 100. Specifically, the graphical element 228 may notify a user when an order is ready to be picked up. For example, the graphical element 228 may be displayed on the screen in response receiving a notification message from the store indicating that the order is ready for pickup. In certain embodiments, the graphical element 228 also may specify the pickup location. In certain embodiments, the graphical element 230 may be selected to display a map of the store showing the pickup location. Of course, various other graphical elements and icons may be included within the receipt screen 226.

FIG. 9 illustrates a close range connection 232 that may be used to initiate and/or complete a payment transaction. The close range connection 232 may include a PAN connection, an RFID connection, an NFC network connection, wireless Internet connection, or other suitable type of close range communication. In certain embodiments, the connection may be established using a device identification networking protocol, such as Bonjour®. The connection may be used to transfer information, such as sales order information and payment information, between the device 10 and another electronic device 234. The close range connection 232 may be established when a user 236 of the electronic device 10 brings the electronic device 10 in close proximity to the other electronic device 234 which may be operated by another user 234 or may operate automatically.

The electronic device 234 may include a handheld portable electronic device, such as a portable media player or personal data organizer, or may include a point of sale or purchase terminal, a vending machine or kiosk, or other suitable payment receiving device. In certain embodiments, the electronic device 234 may be a portable point of purchase device for conducting a sales transaction in accordance with the teachings of the commonly assigned U.S. patent application Ser. No. 12/286,445, entitled "Portable Point of Purchase Devices and Methods," to Gloria Lin et al., filed on Sep. 30, 2008, the entirety of which is herein incorporated by reference for all purposes. In other embodiments, the electronic device 234 may be a handheld electronic device for conducting peer-to-peer financial exchanges in accordance with the teachings of the commonly assigned U.S. patent application Ser. No. 12/286,488, entitled "Peer-to-Peer Financial Transaction Devices and Methods," to Gloria Lin et al., filed on Sep. 30, 2008, the entirety of which is herein incorporated by reference for all purposes. In yet other embodiments, the electronic device 234 may include an electronic kiosk connected to a retail server. In these embodiments, the user 236 of the electronic device 10 may operate both the electronic device 10 and the electronic kiosk, which may not require the presence of the user 238.

Figure 10:
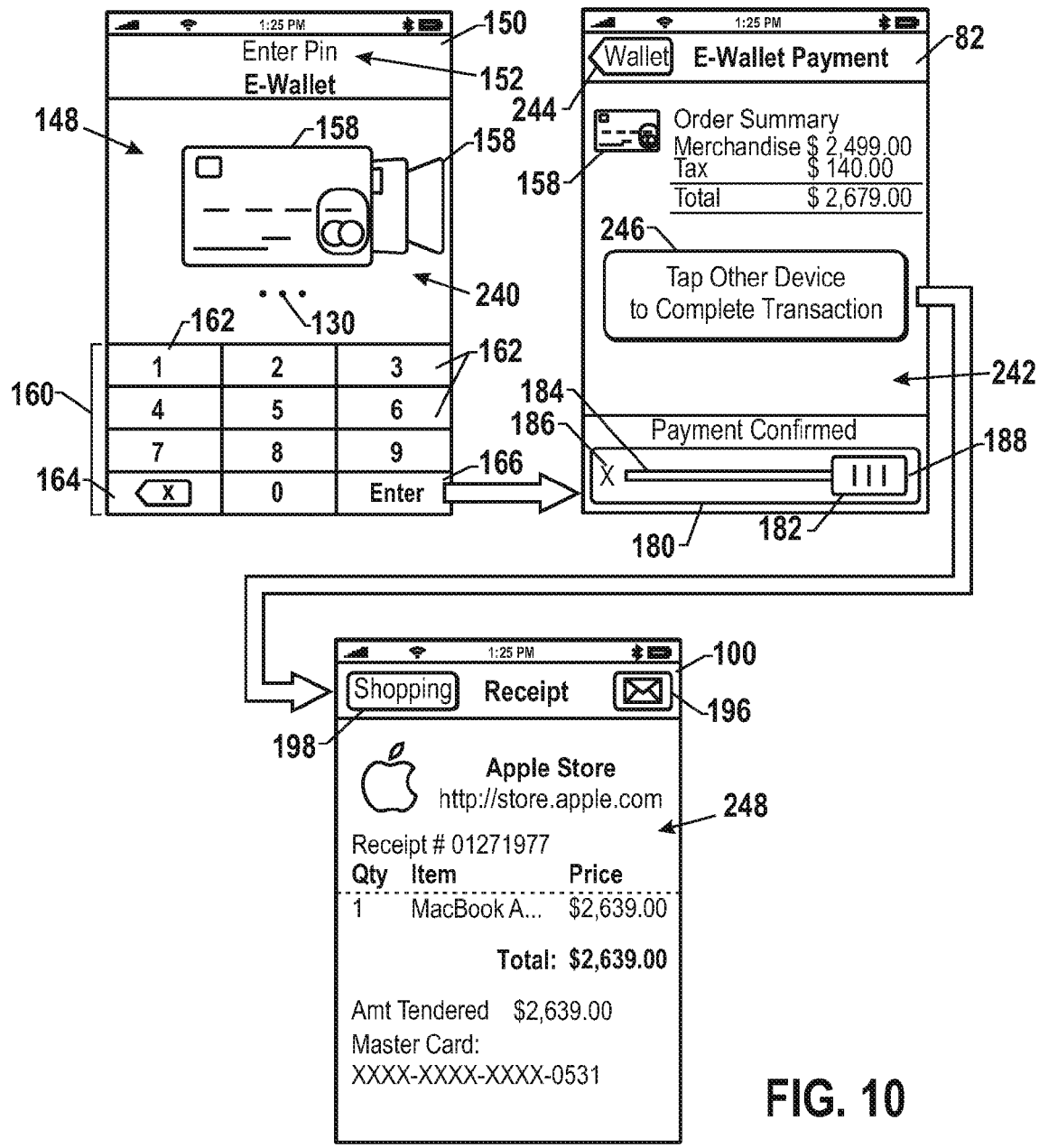
FIG. 10 a view of screens of the device of FIG. 1 illustrating confirmation of a payment from an electronic wallet in accordance with one embodiment.

FIG. 10 illustrates a series of screens for confirming a payment transaction through an electronic wallet application. In certain embodiments, the device 10 may display the electronic wallet application in response to sensing a close range communication 232 with another electronic device 234 as illustrated in FIG. 9. The device 10 also may display the electronic wallet application in response to receiving information related to a payment transaction, such as a sales order, from another electronic device, such as the device 234 shown in FIG. 9. In other embodiments, the electronic wallet application may be accessed by selection of the icon 102 (FIG. 4).

Upon opening, the electronic wallet application may display a selection screen 240 that may be used to select a payment instrument for a financial transaction. The selection screen 240 may include the images 158 of payment instruments accessible through the electronic wallet. After a payment instrument has been selected and a PIN has been entered, if required, the device 10 may display a confirmation screen 242. The screen 242 may include a graphical element 244 that can be selected to return to the selection screen 240. The screen also may include an order summary 245 and an image 158 of the selected payment instrument.

The confirmation screen also includes the graphical element 180 that may be used to confirm the payment. As described previously with respect to FIG. 5, a user may drag the slide bar 182 to the confirmation position 188 to confirm the payment. In one embodiment, after the payment has been confirmed, the device 10 may display a window 246 on the confirmation screen 242 prompting the user to bring the device 10 in close proximity to or contact with the other electronic device 234 (FIG. 9) (such as by tapping the devices together) to complete the transaction. For example, in one embodiment, when the user taps the device 10 to the other electronic device 234, the device 10 may transfer payment information to the other electronic device 234 to confirm the payment transaction over the close range connection 232. The electronic device 234 may then subsequently transmit the payment information to the financial institution responsible for processing the payment. Further, during the tap, the devices 10 and 234 may exchange information, such as a service set identifier (SSID), channel, and encryption key, for establishing a longer range connection, such as WLAN connection or a WAN connection. The payment information may then be transferred to the electronic device 234 over the longer range connection that was established using the close range connection 232. In other embodiments, the payment information may be transferred over the longer range connection directly to the financial institution. After the information has been transferred, a receipt screen 248 may be displayed that summarizes the order for the user.

Figure 11:
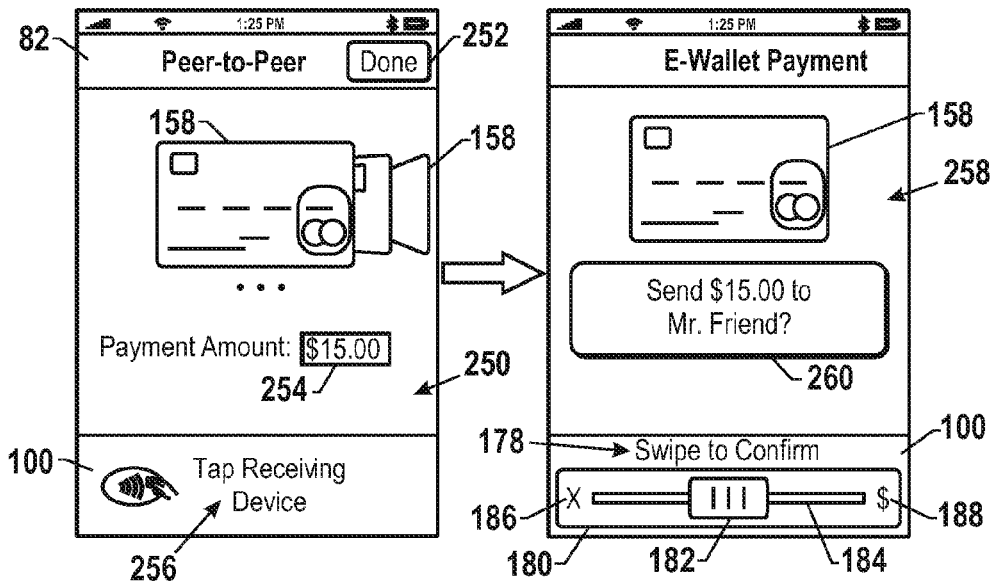
FIG. 11 a view of screens of the device of FIG. 1 illustrating confirmation of a peer-to-peer payment in accordance with one embodiment.

FIG. 11 illustrates a series of screens that may be used to confirm a payment transaction during a peer-to-peer financial transaction. The peer-to-peer transaction may occur over a close range connection such as the connection 232 illustrated in FIG. 9. In certain embodiments, the device 10 may display a peer-to-peer transaction screen 250 in response to sensing a certain close range connection. The transaction screen 250 also may be accessed through a menu of the electronic device 10.

The transaction screen 250 includes a graphical element 252 that may be selected to return to the main menu of the electronic device shown in FIG. 1. The screen 250 also includes images 158 of payment instruments that may be selected for payment transactions. The payment instruments may represent credit cards, debit cards, check, and bank accounts, as well as other payment forms. As noted above, the indicators 130 may notify a user that additional cards may be viewed by scrolling thorough the images 158 using the touch screen 54 (FIG. 2). After a payment instrument is selected, a user may enter a payment amount within an entry area 254. For example, as shown, the user has entered the amount of $15.00 for payment to another person. The screen 250 also includes a lower summary bar with instructions 256 prompting the user to tap the receiving device. During the tap, the information may be transferred over a close range connection 232 (FIG. 9), such as an RFID connection, NFC connection, or other close range connection.

After the tap, the device may display a confirmation screen 258. The screen 258 includes an image 158 of the selected payment instrument and a display area 250 prompting the user to confirm that the payment. The display area 250 may display the payment amount, the identity of the payment recipient, and other information describing the payment transaction. In certain embodiments, the device 10 may receive information corresponding to the identity of the payment recipient over the close range connection 232 (FIG. 9). The confirmation screen also includes a lower summary bar 100 that includes the confirmation graphical element 180. As described above with respect to FIGS. 4 and 5, a user may drag the slide bar 182 toward the confirmation position 188 to confirm the payment. If the user does not wish to confirm the payment, the user may drag the slide bar 182 toward the decline position 186 to decline the payment.

Of course, the payment transactions illustrated with respect to FIGS. 9-11 may be confirmed using other types of graphical elements and motion configurations. For example, the graphical elements 218, 220, and 222 shown in FIG. 8 may be used to confirm peer-to-peer payment transactions and/or electronic wallet payment transactions. Further, the relative sizes and shapes of the graphical elements 10, 182, and 184 may vary or may be configured by the user, and the respective locations of the confirmation position 188 and decline position 186 may change to provide other movements and directions for confirming the payment transaction.

Figure 12:
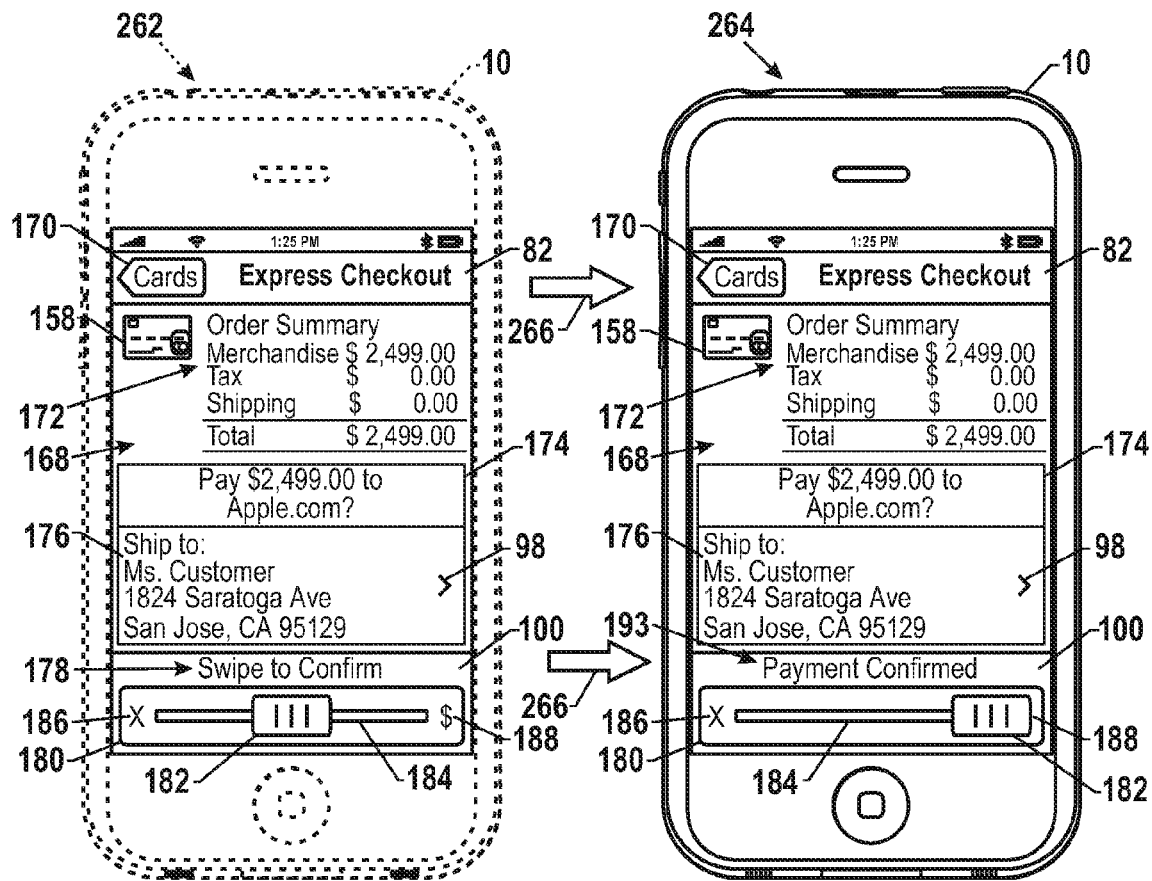
FIG. 12 is a front view of the device of FIG. 1 illustrating confirmation of a payment transaction through motion of the device in accordance with one embodiment.
Figure 13:
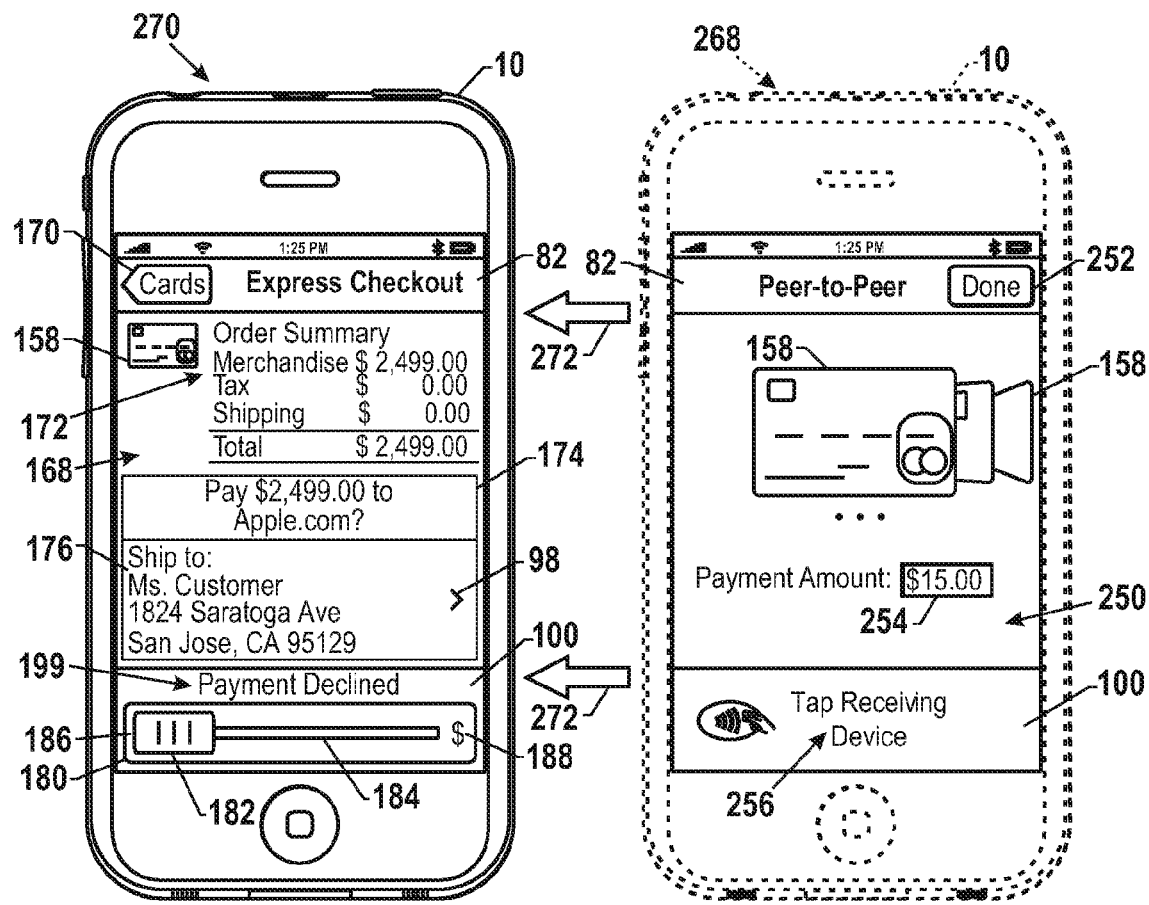
FIG. 13 is a front view of the device of FIG. 1 illustrating rejection of a payment transaction through motion of the device in accordance with one embodiment.

In addition to confirming a payment transaction by motion sensed through the touch screen 54, a payment transaction also may be confirmed by motion sensed through the motion sensing device 62 (FIG. 2) as illustrated in FIGS. 12 and 13. The payment transaction confirmations illustrated in FIGS. 12 and 13 may be employed in various payment transaction contexts including, but not limited to, online shopping, in-store shopping, electronic wallet transactions, and peer-to-peer transactions.

FIG. 12 illustrates movement of the device 10 to confirm a payment transaction. The device 10 is depicted as having moved from an original position 262 to a new position 264. For the sake of clarity, the screen of the device 10 in the original position 262 is shown in solid lines. The payment confirmation screen 168 may be displayed when the device is in the original position 262. The user may then move the device 10 itself to the right, as indicated by the arrows 266, to move the slide bar 182 to the confirmation position 188. In certain embodiments, the motion sensing device 62 (FIG. 2) within the electronic device 10 may sense the motion of the device 10 to acquire motion data. Using the motion data, the CPU 46 may move the slide bar 182 contemporaneously with the motion of the device 10. In this manner, a user may be able to move the slide bar 182 along the track 184 to the confirmation position 188 without touching the touch screen 54 or other input structure. When the slide bar 182 reaches the confirmation position 188, the device 10 may transmit payment information to confirm the payment transaction.

FIG. 13 illustrates movement of the device 10 to decline a payment transaction. As shown by the arrows 272, a user has moved the device 10 to the left from an original position 268 to a new position 270. As noted above, the motion sensing device 62 (FIG. 2) may sense the motion of the device 10 and the CPU 46 (FIG. 2) may use the acquired motion data to contemporaneously move the slide bar 182 with the motion of the device 10. When the slide bar 182 reaches the decline position 186, the device 10 may display the message 199 indicating that the payment has been declined.

Of course, the right and left motions illustrated by the graphical elements in FIGS. 4-13 are provided by way of example only and are not intended to be limiting. In other embodiments, the motion sensing device 62 (FIG. 2) and/or the touch screen 54 (FIG. 2) may sense other directional movements to move one or more graphical elements to a confirmation position. For example, the motion sensing device 62 may sense other horizontal movements, vertical movements, rotations, and/or tilts to move a graphical element to a confirmation position or decline position.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method comprising an electronic device performing the following steps:
   receiving a user input selecting a payment instrument;
   displaying a confirmation screen for receiving a motion based input to confirm a payment with the selected payment instrument, wherein the confirmation screen comprises a graphical element moveable between an initial position and a payment confirmation position, wherein the graphical element comprises an image of a credit card, and wherein the payment confirmation position comprises an image of a credit card terminal;
   acquiring motion data corresponding to the motion based input, wherein the motion data represents movement of the graphical element from an initial position to the payment confirmation position; and
   confirming, via a processor of the electronic device, the payment with the selected payment instrument in response to the acquired motion data.

2. The method of claim 1, wherein acquiring motion data comprises sensing a direction of motion through a touch screen or sensing levels of pressure applied through the touch screen.

3. The method of claim 1, wherein acquiring motion data comprises sensing motion of the electronic device through a one, two, or three axis accelerometer.

4. The method of claim 1, wherein confirming the payment comprises transmitting at least one of a payment confirmation message, an account number, a sender identifier, a recipient identifier, a payment instrument identifier, remittance advice details, or an authorization key to a financial institution to process a payment transaction.

5. The method of claim 1, comprising
   contemporaneously varying the graphical element displayed on the confirmation screen based on the acquired motion data.

6. A method comprising an electronic device performing the following steps:
   receiving a user input selecting a payment instrument;
   displaying a confirmation screen for confirming a payment with the selected payment instrument, wherein the confirmation screen comprises an image of a credit card that can be swiped from an initial position towards an image of a credit card terminal to confirm the payment using the selected payment instrument;
   detecting movement of the image of the credit card from the initial position towards the image of the credit card terminal;
   confirming, via a processor of the electronic device, the payment with the selected payment instrument based on the movement of the image of the credit card; and
   transmitting payment information to a financial institution to process the payment transaction in response to confirming the selected payment instrument.

7. The method of claim 6, wherein detecting movement of the image of the credit card comprises detecting movement through a touch screen of the electronic device.

8. The method of claim 6, comprising detecting movement of the electronic device through a one, two, or three axis accelerometer, and contemporaneously varying the image of the credit card based on the detected movement of the electronic device.

* * * * *